United States Patent [19]

Klingen

[11] Patent Number: 4,634,849

[45] Date of Patent: Jan. 6, 1987

[54] UNIQUELY NUMBERED BAGGAGE SPLIT TAG AND SYSTEM FOR HANDLING BAGGAGE

[76] Inventor: Leonard G. Klingen, 10700 SW. 134 Ter., Miami, Fla. 33176

[21] Appl. No.: 719,082

[22] Filed: Apr. 2, 1985

[51] Int. Cl.4 ............................................. G06K 19/00
[52] U.S. Cl. ...................................... 235/487; 235/493
[58] Field of Search ................................ 235/487, 493

[56] References Cited

U.S. PATENT DOCUMENTS 3,576,972  5/1971  Wood ................................... 235/493

Primary Examiner—Harold I. Pitts
Attorney, Agent, or Firm—John Cyril Malloy

[57] ABSTRACT

A uniquely numbered identification tag for luggage having a split construction and including a base having removably supported thereon a plurality of individual tags wherein at least two of the tags are removably attached to different portions of the luggage piece and the third tag is removable from the supporting base and securable to a ticket envelope or positionable in a like location capable of being carried by the passenger or owner of the luggage. The two tags affixed to the luggage include a first indicia display coded so as to be mechanically read wherein the coded indicia is representative of a unique alpha-numeric designation for purposes of handling and identifying a given luggage piece during transport thereof.

18 Claims, 11 Drawing Figures

U.S. Patent   Jan. 6, 1987   Sheet 1 of 3   4,634,849
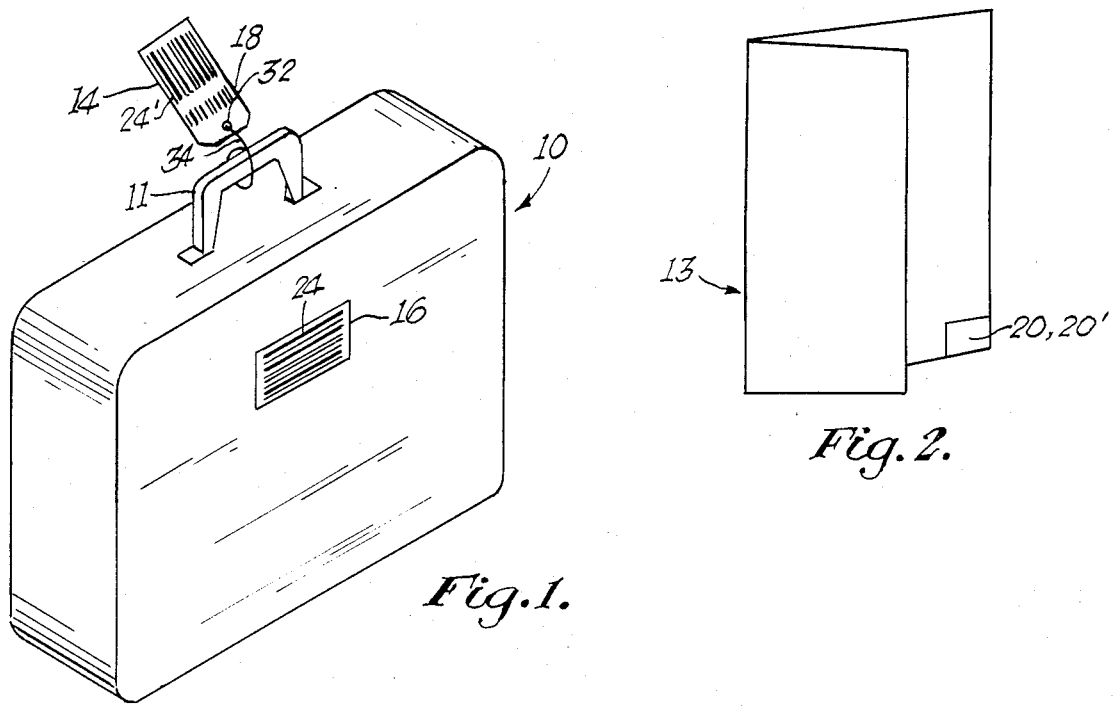
Fig.1.
Fig.2.
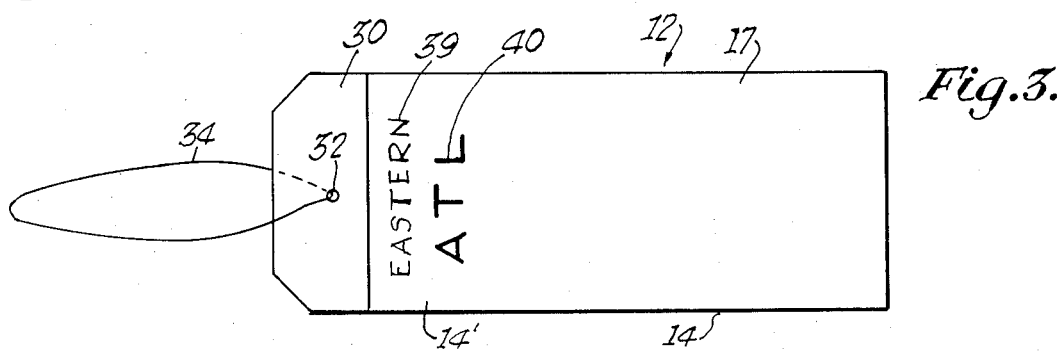
Fig.3.
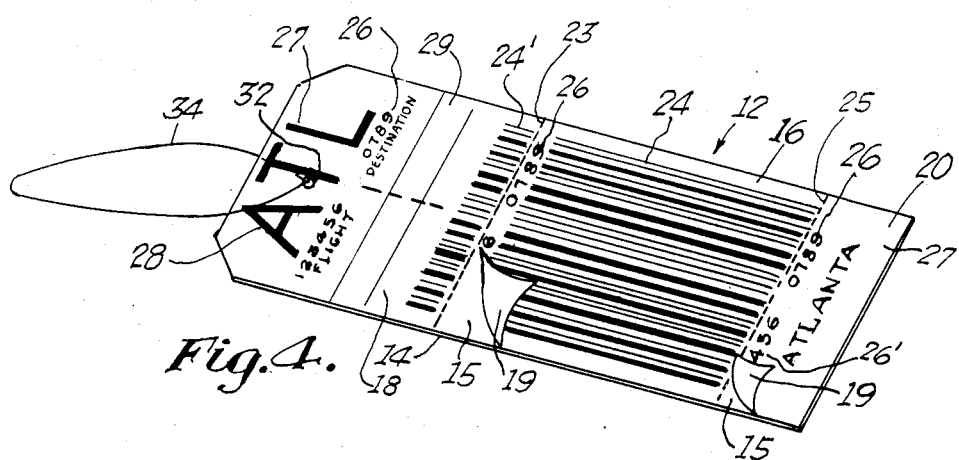
Fig.4.
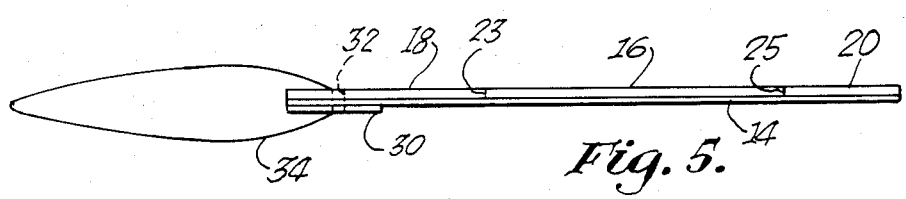
Fig.5.

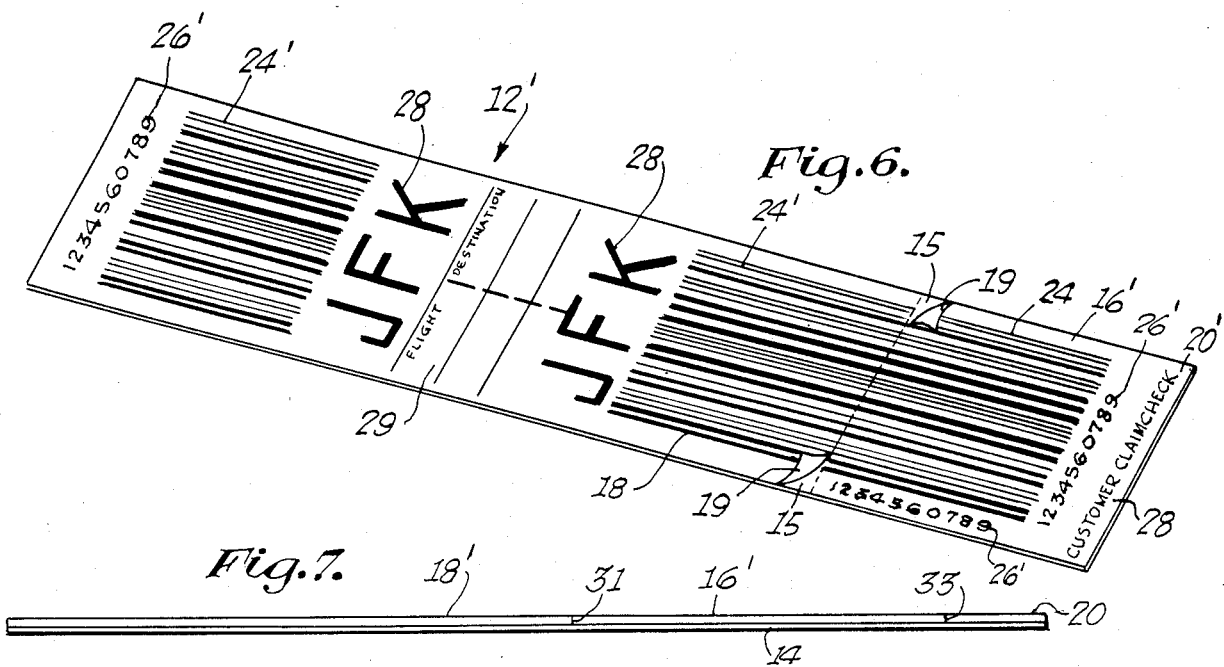
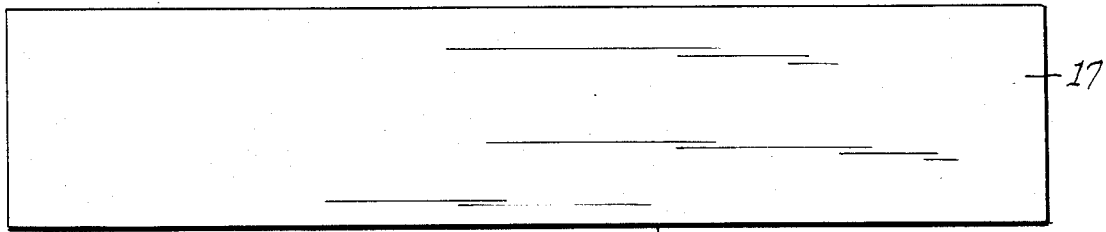
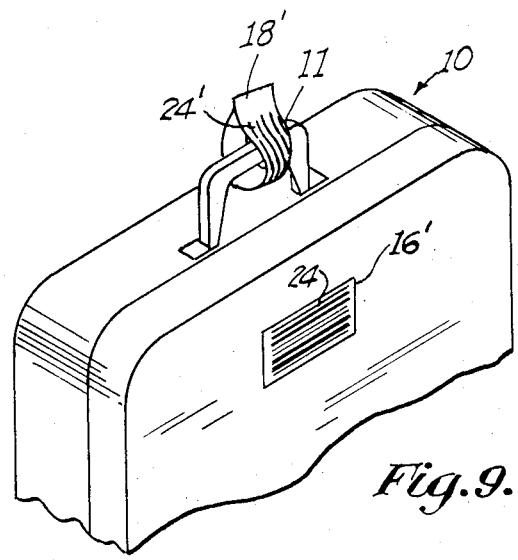
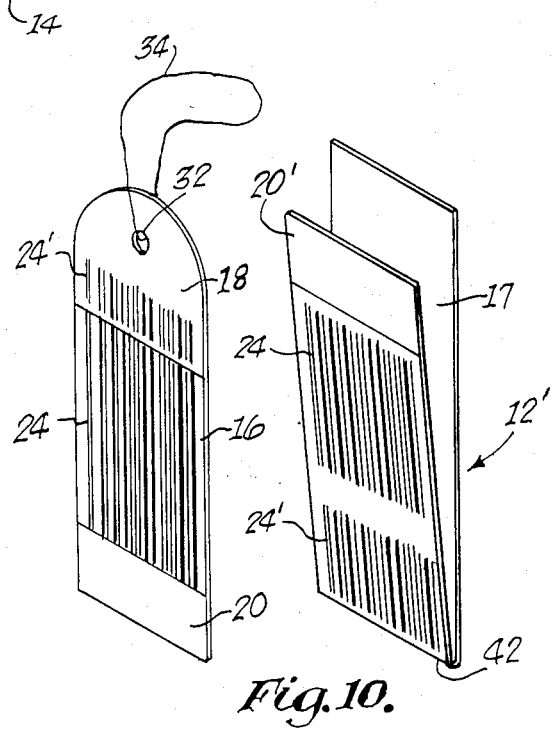

UNIQUELY NUMBERED BAGGAGE SPLIT TAG AND SYSTEM FOR HANDLING BAGGAGE

BACKGROUND OF THE INVENTION

1. Field of the Invention:

An identification tag assembly for luggage being transported by an air carrier or the like wherein the tag assembly includes a split construction comprising a plurality of separable tags at least some of which include coded indicia structured for mechanial reading thereof and representative of a unique alpha-numeric designation for identifying individual luggage pieces wherein such unique designation or number can be entered into a computer system prior to transport and handling and purged from the computer system upon a baggage piece being claimed by the owner at the destination thereof.

2. Description of the Prior Art:

In the transportation industry, handling and identifying passenger baggage is an area which is recognized by the prior art as needing improvement. While problems associated with baggage handling and identification is not limited to the air travel industry, problems faced by the airlines in this area are particularly difficult due to the required separation of heavier luggage pieces from the passenger during travel extremely large number of pieces being handled and the great distances being traveled in relatively short amounts of time. Recognized need for improvement in this area is supported by lost and mishandled luggage being a primary service complaint of airline passengers.

In an attempt to overcome the above set forth problems, the prior art includes numerous designs, apparatus and methods intended to increase efficiency in baggage handling and reduce problems associated with identification of individual luggage pieces from one another other than by manual observation and general description relating to size, color, etc.

The U.S. Pat. No. to Soltanoff, 3,752,312 is directed towards a label, method and system for automated baggage handling wherein the individual luggage pieces are wrapped by a heat shrinkable, encircling belt further including destination identifying indicia capable or structured for reading automatically as by an optical scanner used in combination with suitable electronic data processing equipment. While the disclosure of Soltanoff is certainly operable for the application intended, it does incorporate the heat treatment of the encircling belt for the purpose of shrinking the plastic material from which the belt is formed. It is contemplated that such an additional reinforcing or security step may be less than desirable for certain airline carriers or others associated with baggage handling, identification and transport.

Other structures, methods and apparatus relating to the identification and simplification of baggage handling are represented in the following U.S. Pat. Nos. to Ashley, 4,180,284; Ross, 4,042,171; Bloodworth, 1,367,531; and Singleton, 1,075,505. All of the inventions disclosed in the above set forth patents are intended to overcome certain recognized problems in the prior art. Even in light of these successive improvements in the prior art, there is a need to enhance the ability of luggage identification and handling, preferably through automation, which should have the effect of increasing efficiency of baggage identification, recognition and handling time especially during situations involving peak passenger loads which has become more prevelant with the advent of jumbo jet airplanes.

In addition to the above structures and methods, airlines presently use automatic laser sortation devices. However, such techniques are limited in that the systems being utilized can only sort baggage by city - destination rather than individual flights traveling to such city - destination. It is often desirable, however, to sort baggage by flight numbers especially in those instances when several flights leave for the same destination in a relatively short period of time. Sorting by flight number has not previously been possible since it is not practical to store pre-printed baggage identification tags for several hundred flight numbers at each agent's location. In addition to the above, flight numbers frequently change. Accordingly, airlines have been in the habit of pre-printing and storing tags for destination only. In a typically large station or base for a given air carrier, there may be 300 to 400 flights to a hundred city - destination.

To overcome the above set forth problems, some airlines have incorporated the use of small bar-code printers located near the agent's position to generate bar-coded tags wherein the code incorporates the flight number. Theoretically therefore, the tags and the attached luggage would be sortable through automated, optical scanning techniques by a flight number. However, the process of generating labels, referred to as "on demand" printing is costly due to high maintenance of the printers wherein as many as 50 or 60 of such printers are needed for a large station. Such printers are frequently considered to be of questionable reliability and the quality of the "on demand" generated bar-coded label is not as good as that available when the identification tags are pre-printed. Such reduction in quality frequently results in mishandling of baggage because of misreading the "on demand" printed tags.

SUMMARY OF THE INVENTION

This invention relates to a uniquely numbered identification tag used to identify and facilitate the handling of baggage during transport thereof particularly in the airline industry. The subject tag assembly comprises a split type construction including a supporting base having a plurality of tags mounted on one surface thereof. The plurality of tags includes a first tag removable from the base and separable from the other plurality of tags for removable positioning on an exposed surface such as a side of a baggage piece. A second tag is separable from the other of the plurality of tags and specifically structured to be removably attached preferably to a handle portion of the bag and in spaced relation from the first tag. Both of the first and second tags include a first indicia means defining coded indicia capable of being automatically read by an optical scanner or like device. Such optical scanners are well known in the prior art and are specifically structured to automatically read coded indicia of the type appearing on the first and second tag of the subject tag assembly. The coded indicia is specifically oriented and structured to define a unique alpha-numeric designation, preferably in the form of a multi-digit number. A certain segment or number of digits (preferably the last 4 digits) of this unique multi-diit number is representative of the destination location such as the city to which the individual piece of baggage is being transported. The remaining number (preferably the first 6 digits) of the multi-digit number represent a specific unique number assigned only to one tag assembly and consequently to an individual piece of luggage to which the tag assembly is attached. By virtue of this arrangement, each piece of luggage handled by a system is individually and uniquely identifiable based upon this unique identifying designation. Again, such unique designation is present on both the first and second tag, by virtue of coded indicia, and each tag is individually and removably secured to a given piece of luggage at different locations.

The plurality of tags comprising the tag assembly further includes a third tag which is removable from the supporting base and separable from the first and second tag. This third tag is structured and dimensioned for adhesive attachment on a ticket envelope or like structure conveniently capable of being carried with the passenger and completely separable from the piece of luggage on which the first and second tags are mounted. The third tag as well as at least one and preferably both of the first and second tags include a second indicia means in the form of visually readable alpha-numeric displays indicative of such information as destination location (city) flight number and the unique designation or multi-digit identifying number which the coded indicia represents.

In operation, a passenger arrives at the terminal with one or more individual pieces of luggage. After informing proper airline personnel of his destination, flight number, etc., an individual tag assembly is assigned to each individual piece of luggage. The assigned tag assembly includes a pre-printed bar-code which incorporates a unique number (preferably 6 digits) and a city - destination code number (preferably 4 digits). This information is also printed on the tag assembly in a man-readable alpha-numerical display. Once assigned, the agent exposes the tag assembly including the bar-code to an optical reader and the coded information is transmitted from the optical reader to a mini-computer facility. The agent then checks the flight number and enters it on a keyboard console wherein the flight number as well as the pre-coded information is also transmitted to the mini-computer facility. The mini-computer facility now has three pieces of information: the unique number (123456); the city - destination (SFO corresponding to the code number 0789); and the flight number (125), the latter being typed in on the keyboard by the agent.

The first tag of the plurality of tags of the tag assembly is then fastened to an exposed surface of the one luggage piece. The second tag is removably secured to the handle portion of the same luggage piece and the third tag is given to the passenger and preferably affixed to the ticket envelope that the passenger carries. The individual piece of luggage (or plurality of pieces each having mounted thereon individual tags from individual tag assemblies) are directed to the correct airplane for transportation to the intended city - designation as set forth in greater detail hereinafter. At this point it should be emphasized that the third tag carried with the passenger, as well as at least one of the other first or second tags or both, include a second indicia means which is in the form of visually readable displays which indicate to any observer such information as city designation (JFK-New York Kennedy Airport; MIA-Miami International Airport; ATL-Atlant; etc.) and flight number as well as a visually readable display of the aforementioned unique multi-digit number. After attachment of the individual tags to the individual pieces of luggage, the information sent to the mini-computer by the curbside agent is now passed on by this computer to three locations. First, the information is transferred to the sortation computer, which controls the automatic sortation system. Second, the information is passed to a central computer for tracking purposes and maintaining individual indentity of each luggage piece in the system at all times. Third, the information is transferred to the computer at the destination city to verify that the baggage has been received at that end.

The bag is then placed on the sorting conveyor where it is then exposed to an additional optical scanner which reads and matches the unique number (1, 2, 3, 4, 5, 6) and the destination number (0789) corresponding to city - destination, with the information in the sortation computer. The sortation computer looks for the matching flight number, previous applied by the curbside agent, in its memory and then activates a baggage handling diverter, associated with the conveyor system, to direct the individual bags to the delivery pier designated for a specific flight number. At the delivery pier, the bag is then loaded onto a container which is then transported and loaded onto the aircraft. If sorting of the individual luggage by destination rather than by flight number is desired, such can be accomplished merely by reinstructing the sortation computer which activates the aforementioned diverter to deliver the individual luggage or baggage to the pier designated for that specific designation. Upon reaching his destination the passenger disembarks from the aircraft and locates his luggage at the baggage claim area. Before the luggage is removed from this area, proper personnel can visually check the alpha-numeric display including unique designation or multi-digit number on the third tag carried with the passenger against the same multi-digit unique identifying number carried by either or both of the first and second tags on the luggage piece itself. If such numbers match, the second tag is removed from the handle portion of the luggage and optically scanned or mechanically read by any of a number of conventional devices. This latter optical scanning at the destination city, of the coded indicia of the second tag, serves to purge the computer system of the unique designation or multi-digit identifying number and thereby informs the computer at the city of origin that the individual piece of luggage has been identified and claimed.

However, if the piece of luggage is misplaced, lost, mishandled, etc. and the passenger cannot locate a given piece of luggage, such piece of luggage is relatively easily locatable through the provision of the coded indicia representing the unique identification number on the luggage. This may be accomplished by optically scanning or mechanically reading all the unclaimed luggage at any or all of the cities within the system wherein such cities are in communication with one another through the centralized computer system. Once the individual piece of luggage is located and scanned, the city of origin and/or the city of destination will be automatically informed as to the location of the "lost" piece of luggage through the computer system. Arrangements can thereby be made for the proper transport and/or delivery of the luggage in question to its proper destination. Therefore, the provision of the subject tag assembly, including the coded indicia having a unique designation in the form of an individual and unique identifying multi-digit number eliminates manual searching, through visual observation of unclaimed luggage at obviously a large number of cities throughout the system of a given airline carrier. For example, baggage handling personnel no longer have to attempt to identify and/or locate pieces of luggage by vague and general descriptions such as color, shape, size, etc. All guesswork is eliminated and efficiency in locating misplaced luggage pieces is greatly enhanced.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS:

For a fuller understanding of the nature of the present invention, reference should be had to the following detailed description taken in connection with the accompanying drawings in which:

FIG. 1 is an isometric view of a luggage piece with identifying tags of the tag assembly located thereon.

FIG. 2 is an isometric view of a ticket envelope having a tag separable from the tags of the embodiment of FIG. 1 shown thereon.

FIG. 3 is a rear elevational view showing an exposed surface of the tag assembly of the present invention.

FIG. 4 is an isometric view of the embodiment of FIG. 1 showing the opposite exposed surface and the plurality of tags defining part of the tag assembly.

FIG. 5 is a side view showing structural details of the tag assembly of the present invention.

FIG. 6 is an isometric view of yet another embodiment of the present invention showing a plurality of tags comprising the tag assembly.

FIG. 7 is a side view of the embodiment of FIG. 6.

FIG. 8 is a rear elevational view shown an exposed surface of the embodiment of FIGS. 6 and 7.

FIG. 9 is an isometric view of two of the plurality of tags of the tag assembly of FIG. 6 shown mounted on an individual piece of luggage.

FIG. 10 is an isometric view representing comparative structures of the tag assembly of the present invention.

Like reference numerals refer to like parts throughout the several views of the drawings.

Figure 11:
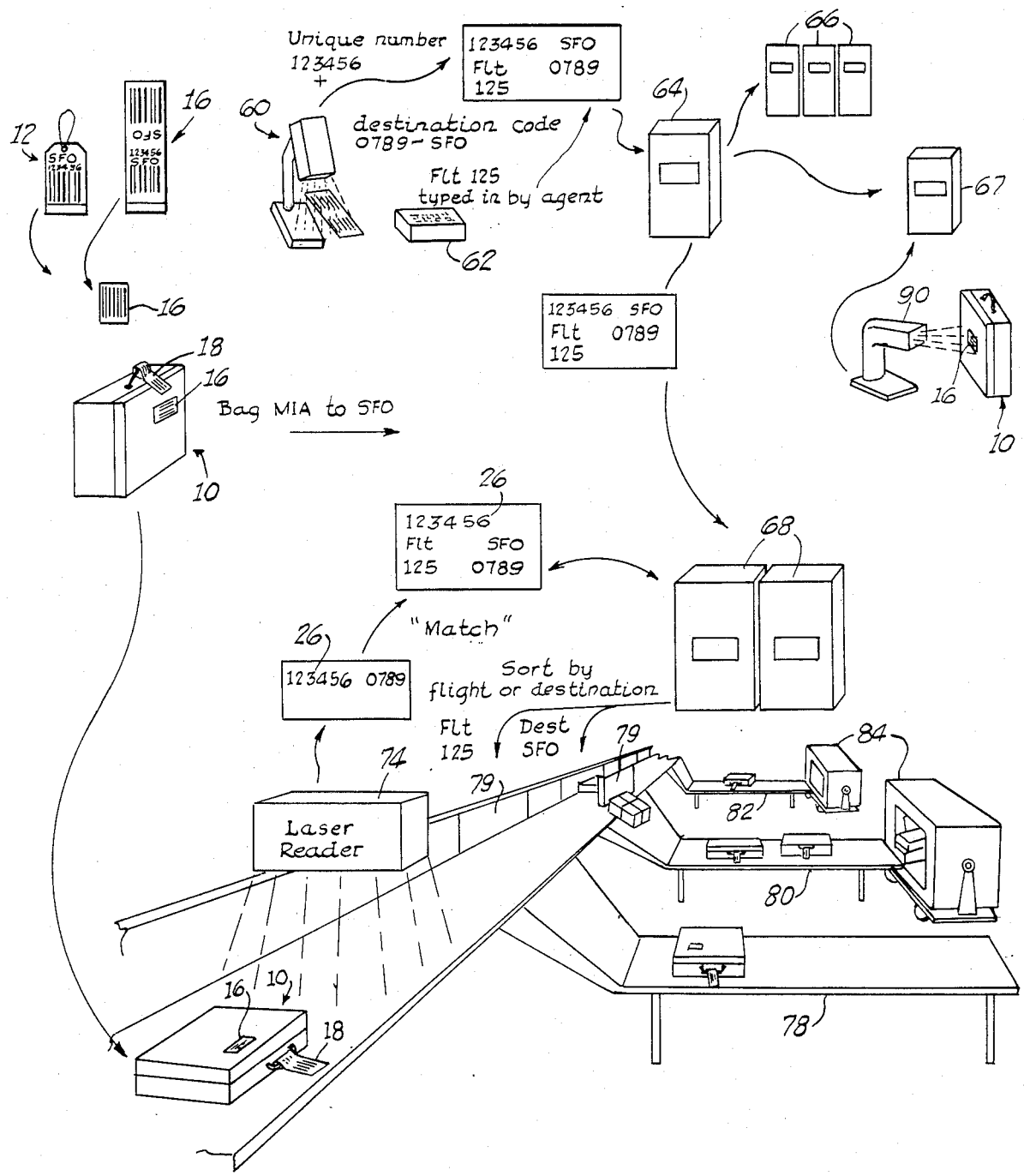
FIG. 11 is a schematic representation disclosing the operateness of the system incorporating the tag assembly of the present invention.

DETAILED DESCRIPTION OF THE PREFERRED EMBODIMENT:

The present invention is directed towards a identification tag assembly generally indicated as 12 in FIGS. 3 through 5 designed and structured to uniquely identify individual pieces of luggage generally indicated as 10. More specifically, the tag assembly 12 comprises a base 14 extending the length of the tag assembly 12 and including a first surface 17 defining an exposed surface of the entire tag assembly.

A plurality of individual tags are mounted on the opposite or second surface 15 of base 14 and comprise a first tag 16, a second tag 18, and a third tag 20. An important feature of the present invention is the split construction of the subject tag assembly 12 wherein each of the first, second and third tags, 16, 18 and 20 respectively are separable from one another along respective seams or junctions 23, 25 (FIGS. 4 and 5). These seams may be formed from what is known in the art as a "kiss cut" wherein in the embodiments shown in FIGS. 3 through 5, first tag 16 is separable from base 14 and from each of the second and third tags 18 and 20 respectively. Similarly, the third tag 20 is separable from surface 15 and base 14 as well as the first tag 16. The construction of the second tag 18 is such that it is clearly separable from the adjoining, contiguous first tag 16 but may remain in engagement with the base 14 for proper structural integrity and support. The base 14 remains affixed to tag 18 which, as shown in FIG. 1, is connected or mounted on the handle 11 of the luggage 10 as will be explained in greater detail hereinafter. The maintenance of the base 14 on the tag 18 also helps reduce the debris problem and eliminates the need or requirement for the baggage handling personnel to tear the base 14 from the tag 18 and dispose of it at curbside.

Additional structural features of the tag assembly as shown in FIGS. 1 through 5 include the undersurface 19 of each of the first tag 16 and third tag 20 being adhesively but removably secured on the second surface 15 of base 14. To accomplish ease of removal of these tags from surface 15, an adhesive coating is disposed on the undersurface 19 of the respective tags 16 and 20 and the second surface 15 of base 14 may be structured to be smooth or slick and thereby not permanently or fixedly bond with the adhesive on the undersurface 19 of the respective tags.

As will be explained in greater detail hereinafter, this adhesive coating on undersurface 19 will facilitate attachment of the respective tag to luggage 10 and ticket envelope 13 (see FIGS. 1 and 2).

Additional structural features comprise a connecting means defining part of the second tag 18 of the tag assembly. This connecting means is structured for interconnection of the second tag 18 about the handle portion 11 of the luggage piece 10 in the manner clearly shown in FIG. 1. Accordingly, the connecting means includes a strand 34 which may be elastic to some extent and interconnected to the second tag 18 by passage through an aperture 32. The aperture 32 is integrally formed to extend through the tag 18, base portion 14 and a reinforcing portion or member 30. As best shown in FIGS. 3 and 5, the reinforcing portion 30 is disposed in surrounding relation to the aperture 32 and fixedly attached to the first surface 17 of the base 14. The reinforcing portion 30 is preferably formed from a tear-resistant material such that pulling stress or force exerted about the periphery of the aperture 32 will not result in tearing or ripping of the first tag 18 since adequate tear-resistance is supplied by the reinforcing portion 30.

An important structural feature of the present invention is the ability of the subject tag assembly 12 to uniquely identify each and every individual piece of luggage 10. Such is accomplished through the provision of a first indicia means in the form of coded indicia 24, 24' formed on the exposed surface of both the first tag 16 and the second tag 18. As clearly represented in FIG. 4, the coded indicia 24, 24' is particularly structured to be of the type capable of being mechanically read such as by an optical scanner, laser, holographic device, etc. Such optical scanners are common in the retail industry and are frequently used in food stores or supermarkets to read lables on food packaging. However, the coded indicia 24, 24' differs from such prior art labeling techniques in that the coded indicia represents a unique multi-digit designation, preferably defining a ten digit number. A portion or segment of the ten digit number (preferably the last 4 digits—0789) may be specifically coded to represent a city - destination. However, the remaining first six digits (123456) of the preferred ten digit indentification number is unique for each tag assembly and accordingly unique for each piece of luggage 10 on which the individual tags 16 and 18 are placed. Thrrefore, each luggage piece 10 passing through the baggage handling system of an air carrier will be individually and uniquely identified through the coded indicia 24 appearing on first tag 16 and 24' appearing on second tag 18. The unique identification number defined by the coded indicia 24 and 24' is the same on both the first and tag 16 and 18 for the reasons described herein.

In addition to the above, a second set of indicia 26 in the form of an alpha-numeric display is printed on an exposed face of the third tag 20 as at 26 as well as at least one and preferably both the first and second tags 16 and 18 respectively. Such alpha-numeric display is visually readable and indicates to the observer including the passenger, baggage handler, security personnel, etc. such information including flight number, destintion location such as city (Atlanta-ATL; New York Kennedy- JFK). In addition, the unique identification number 26' may also comprise a portion of the visual display. A passenger and various personnel handling the individual pieces of luggage 10 may visually check and compare the third tag 20, serving as a claim check and mountable on a ticket envelope 13, with one or both of the first and second tags 16 and 18 appearing on each of the individual pieces of luggage 10 at spaced locations from one another.

In operation, and with reference to FIG. 11, one or more individual pieces of luggage 10 are brought to a baggage check area prior to departure. The passenger informs the proper personnel as to his destination, air carrier, flight number, etc. A tag assembly 12 or 12' is then chosen by the baggage handling personnel based on such information provided and further, on the fact that the first surface 17 of the tag assembly 12 includes a third indicia means in the form of an alpha-numeric display representing visually readable indicia 39 (air carrier) and city - destination 40. Prior to placing the individual tags 16 and 18 on the individual pieces of luggage 10, the agent handling the luggage passes the tag assembly 12 under an optical scanner or laser reader 60 in order to record and place into the computer system, the bar-coded information on the tag assembly 12. This information includes the unique 6 digit number and the 4 digit city code number which is also available for visual observation in alpha-numeric display on the tag assembly. Once the coded information is scanned by the computer 60, it is transmitted to the mini-computer 64 and then transmitted to central computer storage 66 interconnecting the various computers throughout the system of a given air carrier. The agent then checks the flight number of the flight on which the passengers and designated baggage are scheduled to travel. The agent enters the flight number on a keybard console 62 and through such entry this information is transmitted to the mini-computer 64. The mini-computer 64 now has three pieces of information; the unique 6 digit number (123456); the city - destination code (SFO—0789); and the flight number (125), the latter being submitted to the mini-computer 64 by entry from keyboard 62 by the agent in charge of handling the luggage.

This information is then transmitted by the mini-computer 64 to three distinct locations. First, to the sortation computer 68, which controls the automatic handling and sortation system. Second, to the central computer 66 for tracking purposes. Third, to the computer 67 located at the city - destination so that baggage arriving can be verified once it has been received.

The tag assembly 12 is then applied to the individual piece of luggage 10 by placing the first tag 16 on an exposed surface of the luggage piece 10 and the second tag 18 in connection with the handle portion 11. The third tag 20 is given to the passenger and/or preferably placed at a designated location on a ticket envelope 13 such that the third tag 20 may serve as a claim check for comparison by security personnel when the passenger claims or picks up his luggage piece 10 at the destination city. Once the various first, second and third tags 16, 18, and 20 respectively are properly positioned on the luggage 10 and the ticket envelope 13, the individual piece of luggage is placed into the luggage handling facilities for direction to the proper aircraft or means of transport which will accomplish delivery of the luggage piece 10 to the intended destination city. More specifically, bag 10 is placed on the conveyor system generally indicated as 70 where it passes under or is exposed to a laser or like optical reader 74 which reads and matches the unique number (123456) and the city - destination code number (0789) with the information in the sortation computer 68. The sortation computer 68 looks for the matching flight number (125) in its memory and then activates a diverter 79 to direct the bag 10 to the sorting pier 78, 80, or 82 designated for the particular flight number (125). At the proper sorting pier, the bag 10 is then loaded onto a container carrier 84 which is then transported to the correct aircraft for loading of the luggage thereon. The luggage piece 10 is then stored on the aircraft for transport to its intended destination. Upon arrival, the passenger presents the third tag 20 to the security or other personnel when locating his luggage piece 10. The visually readable indicia 26' is compared since it appears both on the third tag 20 (claim check) and either one or both of the first and second tags 16 and 18. If the portion of the visually readable indicia 26', representing the unique number assigned to each individual luggage piece 10 match, the passenger is allowed to remove his luggage piece 10 from the claim area. However, upon leaving, the first or second tag 18 is removed from the handle portion 11 and optically scanned by scanner 90. This scanning serves to again enter the unique designation or indentification number defined by the coded indicia 24, 24' into the computer system and specifically to the central computer 66. This second entry at the city - destination causes a purging of the unique identification number from the computer system at the city of origin as well as throughout any central memory etc., since the individual piece of luggage 10 has been removed from the baggage handling facilities and system. If, however, an individual piece of luggage 10 is misplace or "lost", searching of any or all of the other cities within the system of a given air carrier is possible. The unique designation or identifying number is readily accessible to each of the cities. All unclaimed luggage in the various cities may be optically scanned and the individual misplaced luggage piece 10 is thereby immediately discovered. The intended or correct destination city is thereby informed of the actual location of the misplaced luggage piece 10 and arrangements can be made for proper transport to such intended city of destination if the luggage piece has inadvertently traveled to the wrong destination.

The present invention includes an additional preferred embodiment as shown in FIGS. 7 through 10 which effectively operates in the same manner as the embodiments of FIGS. 1 through 5. More specifically, the tag assembly 12' comprises a base 14 being of one-piece construction and including a first surface 17. The base 14 includes a second surface 15 on which the plurality of tags are removably mounted. Such plurality of tags include a first tag 16', a second tag 18' and a third tag 20'. The embodiment of FIGS. 6 through 8 defines a split tag construction similar to that as explained with regard to the embodiments of FIGS. 3 and 4. More specifically, each of the tags 16, 18 and 20 are separable from one another along respective seams or junction lines 31, 33. A plurality of tags are disposed in substantially aligned, contiguous but separable relation. to one another along such junction lines 31 and 33. Removable attachment or mounting of the individual tags on the second surface 15 of base 14 is similarly accomplished by placing an adhesive coating or like material on the undersurface 19 of each of the tags 16, 18, and 20. Such tags can be affixed to the individual piece of luggage 10 and/or ticket envelope 13 by virtue of this adhesive.

The tag assembly 12' is similarly mounted on individual pieces of luggage 10 by adhesively and removably securing the first tag 16' to an exposed face of the luggage piece 10 as shown in FIG. 9. However, the second tag 18' has an elongated configuration such that opposite ends may be joined to one another also by adhesive coating on the undersurface 19 of these respective longitudinal ends so as to form a substantially closed loop configuration also as best shown in FIG. 9. This closed loop configuration of the second tag 18' is disposed in substantially surrounding relation to the handle portion 11 and in spaced relation to the location of the first tag 16'. As set forth above, the third tag 20' is mounted on a ticket envelope 13 or like support for carrying with the passenger and serving as a claim check.

Both the first tag 16' and second tag 18' include the first indicia means comprising the coded indicia 24, 24' defining in mechanically or optically readable code a unique designation, preferably in the form of a multi-digit identification number. Such multi-digit identification number is also represented as an alpha-numeric display 26' on the third tag 20' as well as at least on one and preferably both of the first and second tags 16' and 18'. The third tag 20' may have other visually readable indicia 28 disposed thereon which may be directed to other informational material. Similarly, each of the embodiments of each of the tag assemblies 12 and 12' may include an open space 29 in which writing may occur such as additional flights of information or destination locations. Yet other structural features of the present invention comprise the material from which the plurality of tags are formed being of a flexible material capable of being peeled from the supporting surface 15 of the space 14 as described above. Such material is commercially available.

Structural differences clearly exist between the embodiments of FIGS. 3, 4, 5, 6, 7, 8 wherein such structural differences primarily relate to the structural configuration of the second tag 18 and 18' respectively. It should be noted that in use and operation of the subject tag assembly, the first tag is removably disposed on a clearly viewable and exposed surface such as the side or front panel of an individual piece of luggage 10. When so positioned, conventional optical scanners will serve to mechanically read or accurately scan the first tag and the coded indicia 24 thereon 98% of the time. However, the location of the second tag 18 on the handle portion 11 of the individual luggage piece 10 is read approximately only 60% of the time due to its location and/or the possibility of distortion as by handling. Accordingly, while the second tag 18 is not absolutely imperative for proper and unique identification of the individual luggage pieces 10, it does serve the convenient function of purging the computer by it being readily removable from the handle portion 11 and optically scanned by any number of a plurality of commercially available optical scanners or like devices. Another important feature of the tag is that it identifies the bag in two places—by virtue of sections 16 and 18, thereby reducing the chances of loss due to separation of the tag during transportation. Conventional methods only identify the bag with one tag which is often lost, rendering identification impossible.

With reference to FIG. 10, it is seen that the embodiment 12' of the tag assembly is readily foldable upon itself to assume a length substantially equal to the normal length of the tag assembly 12. This is convenient in that both styles may be simultaneously utilized and/or fit within conventionally sized classification boxes or trays (shelving, etc.) such that the baggage personnel may readily observe the surface 17 of the base 14 to determine what tag assembly, based on destination city, flight number, etc. should properly be placed on an individual piece of luggage 10.

The above set forth invention thereby serves to uniquely identify each individual luggage piece 10 entered into the system and maintain effective surveillance of this luggage piece 10 as it travels throughout the system such that it can be readily identified and located without resort to general, ineffecient descriptions relating to size, shape, color, etc.

What is claimed is:

1. An identification tag assembly of split construction primarily designed to identify a luggage piece during transport thereof, at least partially by a mechanically readable code, said tag assembly comprising:
    (a) a base including a first surface and a second surface, said first surface disposed to define a first exposed surface of said tag assembly,
    (b) a split construction comprising a plurality of tags supported on said base and secured to said second surface in aligned relation to one another so as to collectively define a second exposed surface of said tag assembly,
    (c) said plurality of tags comprising a first tag separable from said base and structured for removable positioning on an exposed surface of a passenger's luggage piece, a second tag separable from said first tag and removably positionable on the passenger's luggage piece in spaced relation to said first tag, and a third tag separable from said base and said first and second tags and structured for carrying with the passenger,
    (d) a first indicia means for identifying the luggage piece formed on said first tag and said second tag and structured to define coded indicia structured for mechanical reading thereof,
    (e) a second indicia means for identifying the luggage piece and formed on said third tag and at least one of said first and second tags, and
    (f) said first indicia means disposed and structured for mechanical reading thereof both when disposed, via said respective tags, on and off the luggage piece.

2. A tag assembly as in claim 1 wherein said coded indicia of said first indicia means is structured to define a unique designation for each of a plurality of tag assemblies, whereby each luggage piece having at least one of said first and second tags is uniquely designatable and identifiable by virtue of said unique designation.

3. A tag assembly as in claim 2 wherein said coded indicia is structured to define a unique designation comprising a multi-digit number, a segment of said multi-digit number being representative of an intended destination location for the luggage piece.

4. A tag assembly as in claim 2 wherein said second indicia means comprises a visually readable alpha-numeric display corresponding at least in part to said unique designation.

5. A tag assembly as in claim 4 wherein said alpha-numeric display is formed on at least said second tag and said third tag.

6. A tag assembly as in claim 4 wherein said second indicia means is formed on said first tag, said second tag and said third tag and defines identical alpha-numeric displays.

7. A tag assembly as in claim 1 wherein said first tag is structured for removable attachment to an outer, exposed surface of the luggage piece and said second tag is structured for removable attachment to a handle portion of the luggage piece.

8. A tag assembly as in claim 7 wherein said second tag comprises an initial, elongated configuration including oppositely disposed longitudinal ends structured for attachment to one another, said second tag fixedly positionable into a closed loop of continuous length disposed in surrounding relation to the handle portion of the luggage piece.

9. A tag assembly as in claim 8 wherein said first indicia is disposed to extend along a portion of the length of said second tag on an outer, viewable surface thereof.

10. A tag assembly as in claim 8 wherein said second tag comprises adhesive coating secured thereto adjacent at least one of said opposite longitudinal ends and further disposed to accomplish interconnection beween said oppositely disposed longitudinal ends.

11. A tag assembly as in claim 7 wherein said second tag comprises connecting means mounted thereon for securement of said second tag to the handle portion, said connecting means comprising a reinforcement portion formed of a tear-resistant material attached to said second tag, and extending through said reinforcing portion, and strand means having a closed configuration and passing through said second tag and said reinforcement portion via said aperture and being of sufficient length to surround the handle portion.

12. A tag assembly as in claim 1 further comprising a third indicia means formed on said first exposed surface of said base and defining an alpha-numeric display representative of a destination location of a luggage piece to which said first an said second tags are attached.

13. A tag assembly as in claim 1 comprising a split construction defined by at least said first and said third tags including adhesive secured to an undersurface thereof and being adhesively and removably mounted on said second surface of said base in substantially linearly aligned relation to one another.

14. A tag assembly as in claim 13 wherein said split construction is further defined by said second tag secured to said second surface of said base in linearly aligned relation to said first tag and third tag; said first, second and third tags disposed in successively contiguous and separable relation to one another along the length of said base.

15. A tag assembly as in claim 13 wherein said split construction is further defined by said second tag adhesively and removably secured to said second surface of said base in linearly aligned relation to said first tag and third tag; said first, second and third tags disposed in successively contiguous and separable relation to one another along the length of said base.

16. A method of identification and handling of baggage during transport thereof, preferably by commercial carrier, said method comprising the steps of:
 (a) assigning a uniquely numbered, pre-coded tag assembly to each individual baggage piece and optically scanning the tag assembly for assimilation of the pre-coded unique numbered information,
 (b) transmitting the pre-coded information to a first mini-computer facility for subsequent transmission and independently entering additional carrier identification information in the first mini-computer facility,
 (c) transmitting the pre-coded information and carrier identification information to the following locations:
  (1) a central computer facility,
  (2) a sortation computer facility,
  (3) a second mini-computer facility and the city - designation,
 (d) placing individual pre-coded tag portions of said tag assembly on the assigned individual baggage pieces at a plurality of locations thereon,
 (e) controlling and sorting individual baggage pieces through activation of the sortation computer facility by control of sorting equipment based at least in part on the carrier identification information,
 (f) transporting the baggage pieces to the intended city - designation and allowing baggage pieces to be claimed thereat,
 (g) verifying claim to the baggage pieces and optically scanning pre-coded information on the tag portions upon such verification, and
 (h) transmitting the pre-coded information from the second mini-computer facility to the central computer facility for purging of all computer facilities of the pre-coded information.

17. A method as in claim 16 comprising coding the carrier identification information to be representative of flight number of individual flights traveling of the city of origin to the city - destination.

18. A method as in claim 17 comprising controlling and sorting individual baggage pieces by optically reading the tag portions on the individual baggage pieces and communicating the assimilated information to the sortation computer facility to sort by flight and destination with preprinted tags.

* * * * *